United States Patent [19]

George

[11] 3,925,769

[45] Dec. 9, 1975

[54] DISK GENERATOR

[75] Inventor: Peter K. George, Placentia, Calif.

[73] Assignee: Rockwell International Corporation, El Segundo, Calif.

[22] Filed: Sept. 27, 1974

[21] Appl. No.: 509,882

[52] U.S. Cl. .................... 340/174 TF; 340/174 SR
[51] Int. Cl.² .................... G11C 11/14
[58] Field of Search .................... 340/174 TF

[56] References Cited

UNITED STATES PATENTS

| | | | |
|---|---|---|---|
| 3,825,885 | 7/1974 | Hendel et al. | 340/174 TF |
| 3,828,330 | 8/1974 | Parzefall | 340/174 TF |
| 3,832,701 | 8/1974 | Bobeck et al. | 340/174 TF |

*Primary Examiner*—Vincent P. Canney
*Attorney, Agent, or Firm*—H. Fredrick Hamann; G. Donald Weber, Jr.

[57] ABSTRACT

A one level, replication generator for cylindrical, single wall magnetic domains or "bubble" domains comprises a disk and a conductor that connects the disk to the elements of an adjacent bubble domain propagation path. The disk and conductor can be formed from permalloy while the propagation path, which typically comprises chevron-shaped elements, can also be formed from permalloy. The conductor and disk can be formed to the same level. That is, they can be formed using a one-mask fabrication process, thus precluding the problems of alignment where several mask sequences are used. In operation, a bubble domain seed circulates about the disk under the influence of a cyclically varying, in-plane magnetic drive field. When the drive field is at a suitable orientation, a current pulse is applied to the conductor to cause the bubble domain to strip out to the propagation track. Upon application of a pulse of reversed polarity, the stretched domain is cut, allowing the severed domain to propagate along the track and the seed domain to continue around the disk.

9 Claims, 7 Drawing Figures

DISK GENERATOR

BACKGROUND OF THE INVENTION

1. Field of the Invention

This invention relates to bubble domain generators and, more particularly, to a disk-type replication generator suitable for one-level fabrication.

2. Description of the Prior Art

Bubble domain devices utilize magnetic elements and conductors which overlay the bubble domain film and which provide functions such as replication, generation and detection. These elements and conductors have different magnetic and electrical requirements, necessitating different dimensions (including thickness) and/or materials, and sometimes must overlap physically. As a result, several processing or deposition steps using different masks are necessary. Such processes are called, e.g., two-mask or three-mask processes, while the devices formed thereby are termed two-level or three-level devices.

Much of the effort in bubble domain technology has been directed to decreasing the size of the bubble domains and their associated circuitry. The reasons for doing this include increasing storage capacity in bubble memory devices, decreasing the carry over requirements and thus reducing the cost per bit, and providing higher processing yields. Unfortunately, as bubble domain devices decrease in size, the alignment between different levels becomes increasingly difficult. For this reason, one-mask processes are of considerable interest.

Nearly all of the bubble domain functions—dectection, annihilation, replication and generation—have been achieved in one level designs. One level versions of nucleation generators have been made using a current loop or a straight conductor, but, like multi-level designs, the one-level nucleation generators require excessively high operating currents. Two-level, replication generators based on a permalloy disk typically can operate at considerably lower currents (about 50 ma as compared to 100–300 ma) than nucleation generators. As may be appreciated, it is highly desirable to have a one-level generator design which takes advantage of the inherent efficiency of replication and, more particularly, of disk replication.

SUMMARY OF THE INVENTION

A one level, disk-type replication bubble domain generator is provided. A disk or pad of magnetizable material for propagating a seed magnetic bubble is adjacent a bubble domain propagation path. A conductor for expanding and severing the seed bubble domains extends between and intersects the disk and the propagation path.

Figure 2:
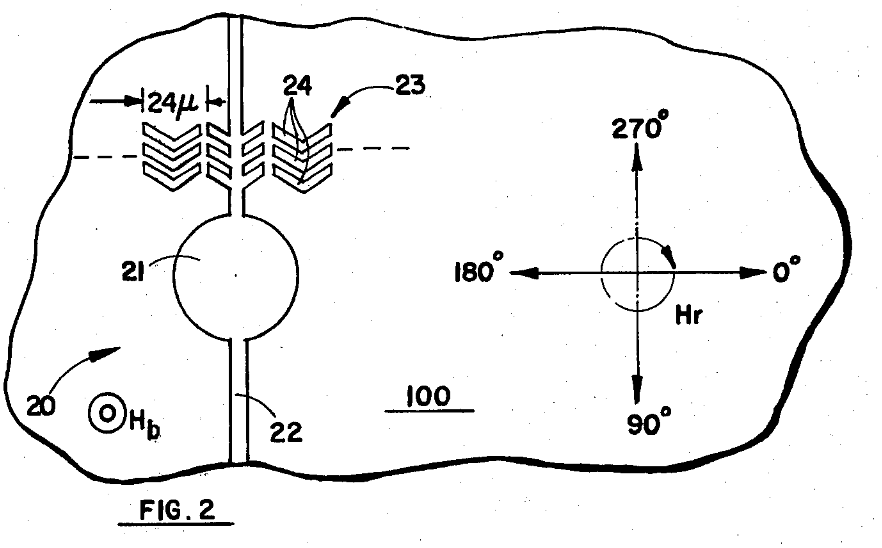
FIG. 2 is a schematic representation of a one-level, disk-type replication generator embodying the principles of the present invention.

FIGS. *3a–d* are schematic representations, in chronological order, illustrating the mode of operation of the generator of FIG. 2.

Figure 4:
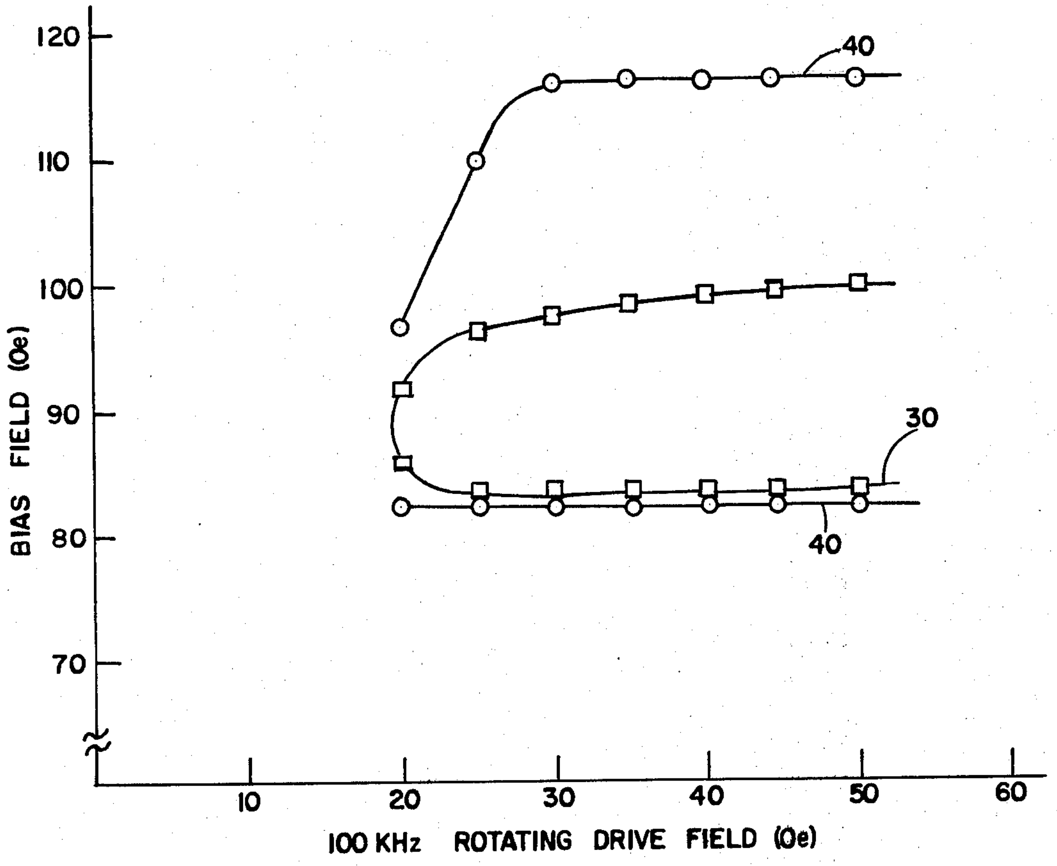

FIG. 4 is a graphic representation of operating characteristics of the generator shown in FIG. 2.

DETAILED DESCRIPTION OF THE INVENTION

Figure 1:
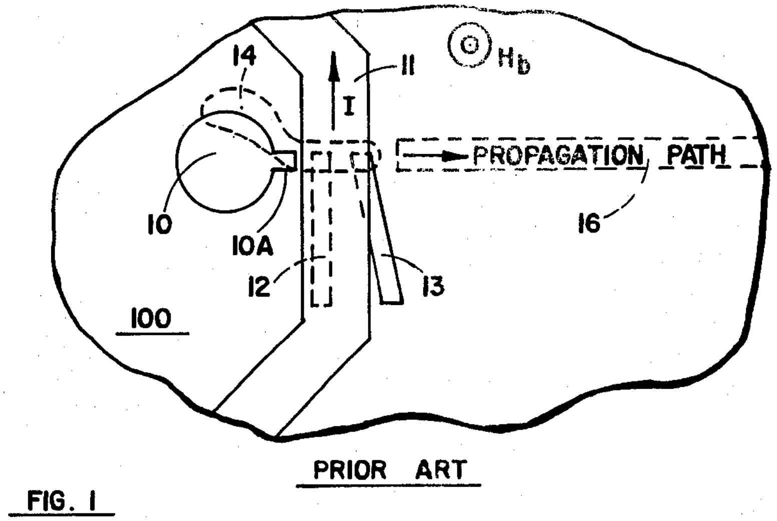
FIG. 1 is a schematic representation of a two-level, disk-type replication generator known in the prior art.

Referring to FIG. 1, there is shown a disk-based replication generator which is known in the prior art. This generator is the subject of U.S. Pat. No. 3,824,565, entitled *Multiple Bar Bubble Domain Generator*, issued to Archer et al, and assigned to the common Assignee. The multiple bar generator utilizes suitable magnetic film 100 for forming bubble domains. The multiple bar generator comprises areas of magnetizable material, such as permalloy, disposed on the magnetic film 100. That is, the generator comprises a pad or disk 10 having a projecting porting 10A and a pair of bar-shaped elements 12 and 13 which are interposed between the disk 10 and the end of a bubble domain propagation path 16 which is comprised of magnetizable elements (not shown). A bias field $H_b$ is applied as suggested in FIG. 1 to provide a suitable magnetic field to establish magnetic bubble domains in film 100. In addition, a cyclically rotating, in-plane magnetic drive field $H_r$ (not shown) is applied in a manner well known in the art to selectively magnetize the elements of propagation path 16 to displace or propagate bubble domains in a controlled manner.

During the operation of the multiple bar generator, a seed bubble domain 14 (shown in dashed outline) is created in the film 100 adjacent to the bottom portion of disk 10 by bias field $H_b$ and circulates under the disk under the influence of drive field $H_r$. When $H_r$ is at appropriate orientations, the upper ends of elements 12 and 13 are magnetized to expand or strip out the seed domain toward the propagation path. Then, a current pulse is applied over a relatively wide-line conductor 11 which is formed over at least element 12. This pulse is of appropriate orientation to server the expanded segment of the seed bubble 14, allowing the severed portion to propagate along the path 16 while the seed bubble 14 continues to circulate under the disk 10.

The multiple bar arrangement shown in FIG. 1 is an improvement of a disk design which is known in the art. The multiple angled bars 12 and 13 and the wide-line conductor 11 provide both ease of replication and excellent operational characteristics. As will be appreciated by reference to FIG. 1, the multiple bar generator is of two levels, in that the conductor 11 overlies at least one (element 12) of the bar elements, and is fabricated using a two-mask process.

Referring now to FIG. 2, there is shown a schematic representation of a one-level replication generator 20, embodying the principles of the present invention. The generator 20 comprises a disk 21 and a relatively narrow, substantially straight line conductor 22. The one level generator 20 is formed on and used in conjunction with a magnetic film 100 which forms bubble domains in the manner discussed relative to FIG. 1.

Replication and a one level design are made possible by the cooperating structural relationship of the disk 21, conductor 22, and an associated propagation track or path 23 for bubble domains. The disk 21 is positioned adjacent to the propagation track 23, which illustratively comprises adjacent columns of v-shaped (chevron) elements 24. The conductor 22 can be formed of the same material as the disk 21 and the chevron elements 24 (e.g. permalloy). The conductor 22 forms substantially a narrow, straight line which is disposed approximately orthogonal to a single column of chevrons. The conductor 22 intersects the individual chevrons. In the preferred embodiment, the intersection of conductor 22 and the chevrons is at the apices thereof. In addition, conductor 22 intersects disk 21 to interconnect the column of chevrons to the disk. In a preferred embodiment, disk 21 is bisected by conductor 22. Some variation in configurational relationships is possible. However, the configuration shown in FIG. 2 is selected to optimize operational characteristics.

Figures 3A, 3B, 3C, 3D:
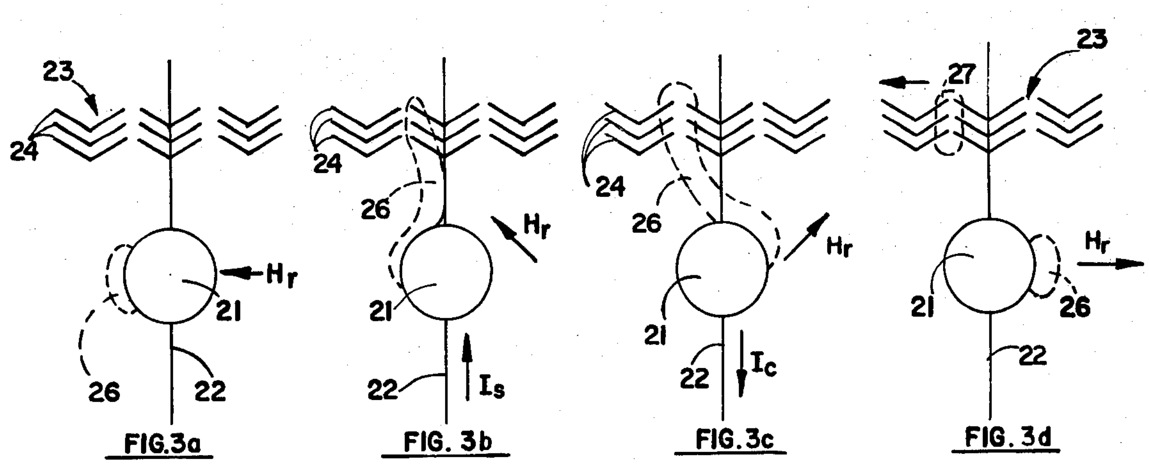

The operation of the one-level replication generator 20 is illustrated in FIGS. 3*a–d*. The generator shown in FIGS. 3*a–d* are similar to the generators shown in FIG. 2. In the presence of a bias field $H_b$, a seed bubble 26 shown in dashed outline is formed in the magnetic film 100 under the disk 21 and circulates about the disk in phase with the cyclically varying, in-plane drive field, $H_r$. This is illustrated in FIG. 3*a* wherein the position of the seed domain 26 along the circumference of the disk corresponds to the 180° orientation of the clockwise rotating drive field, $H_4$ represented by the arrow.

When the drive field, $H_r$, reorients to approximately 225°±20° as shown in FIG. 3*b*, a bubble 26 is moved along the periphery of disk 21. In addition, magnetic poles are produced at the left ends of the chevrons 24 which are connected to conductor 22. Typically, bubble 26 will stretch out or extend from disk 21 to the magnetic poles at chevrons 24. However, if additional magnetic field is necessary or desirable due to the distance between the disk and the chevrons, a strip out current pulse, $I_s$, of the polarity shown, is applied to the conductor 22 by a suitable source (not shown). The magnetic field induced by the current in the conductor 22 increases the potential energy well across the conductor and the chevron column. The increased energy well essentially attracts the seed bubble 26, causing the seed to expand and strip across the chevron track and begin propagating under the influence of the rotating field.

As shown in FIG. 3c, when the rotating field $H_r$ is at about 315°C ± 20°, magnetic poles are produced at the right ends of the next column of chevrons 24. In addition, seed bubble 26 has moved along the periphery of disk 21 as shown. Thus, bubble 26 is stretched even further and now straddles conductor 22. At the time, a current, $I_c$, of opposite polarity from the strip-out current, $I_s$, is applied to cut the expanded domain. This current pulse produces a magnetic field at conductor 22 which tends to repel the bubble domain. This repulsion forces the opposite ends of the bubble domain away from conductor 22 and away from each other and thereby severs the ends into separate bubble domains. As indicated in FIG. 3*d*, a replicate domain 27 is freed to propagate along track 23 in the direction of the arrow under the influence of drive field $H_r$, while seed domain 27 circulates about disk 21 preparatory to a new cycle of operation.

The excellent operating characteristics of the generator 20 were demonstrated using a chevron propagation track 23 having normal periodicity, about 24 μ (See FIG. 2), a permalloy disk 21 of about 24 μ diameter separated from the propagation track by a distance of about 6–10 μ, and a permalloy conductor 22 about 4 μ wide. For components of the above dimensions (which are illustrative only and not limitative of the invention), a 7.5 micron thick bubble domain layer 100 of composition $Y_{2.54}Sm_{0.45}Ga_{1.17}Fe_{3.83}O_{12}$ was used which provided bubbles having 6 micron diameters, along with an $SiO_2$ layer of 1.0 micron thickness, which was interposed between the permalloy components and the garnet film 100. The quasi-static operating margins for the resulting device are shown in FIG. 4. The margins were obtained using a strip-out current, $I_s$, of 75 ma. and of 2–3 microsecond duration. Variations in the type of magnetic film, the geometry of the permalloy elements, the spacing of the propagation elements and the like will, of course, vary with the bubble size.

Curve 30 (indicated by squares) represents the operating margins at high drive frequencies, e.g. 100 kHz, for the chevron propagation track and is representative in general of such structures. That is, for an $H_r$ range of about 20–50 oersteds, the bias field limits are about 80 and 95–100 oersteds. At the lower limit of the bias field, 80 oe., operation is limited by the formation of strip domains from the bubbles, i.e., by bubble strip out. At the upper limit of the bias field values, 95–100 oe., the bubbles collapse.

As shown by curve 40 (circles), the operation of the generator 20 is quite reliable at 100 kHz. and encompasses the range of drive fields for the chevron propagation track. Also, as shown by curve 40, using a 75 ma. strip-out current, $I_s$, the upper and lower bias field limits for which the disk will hold a seed bubble domain are outside the operating limits or margin of the propagation track. Thus, generation over the entire margin of the propagation track is achieved. Moreover, the phase margins for the one level replication generator should be similar to those for any other type of disk generator, and the position of the cutting pulse $I_c$ relative to the strip-out pulse $I_s$ is not critical, particularly at low frequencies.

The 75 ma. current used for the exemplary generator is quite low in comparison to the 100–300 ma. currents used for nucleate type generators. In addition, decreasing the disk-to-track spacing and decreasing the thickness of garnet film 100 should permit lowering $I_s$ to at least 50 ma.

Thus, the one-level, disk-type bubble domain generator 20 incorporates the single conductor 22 in a configuration which allows replication without impeding propagation. Also, the configuration of the disk 21 and the conductor 22, which bisects the disk and intersects the propagation path along the spices of a column of chevrons 15, permits optimum realization of the potential of replication generators for relatively low operating current. In short, this disk-conductor configuration provides an effective replication generator for which the conductor 22 as well as the disk 21 and the propagation path 23 may be formed from a single material, such as permalloy, and may be formed to a single level using a one-mask process.

An exemplary embodiment of the one-level, replication disk generator and dimensions therefore have been shown. The scope of the invention is limited, however, only by the claims appended hereto and equivalents thereof. Having thus described a preferred embodiment of the invention, what is claimed is:

I claim:

1. A magnetic bubble domain generator disposed on a magnetic bubble domain film comprising:

a bubble domain propagation path defined by adjacent areas of magnetizable material a seed bubble domain area of magnetizable material disposed on the bubble domain film adjacent said propagation path for establishing a seed bubble domain; and a conductor intersecting said seed bubble domain area of magnetizable material and one of said adjacent areas of magnetizable material in said propagation path for passing a current between said seed bubble domain area and said adjacent areas.

2. The magnetic bubble domain generator recited in claim 1 wherein said seed bubble domain area, said adjacent areas, and said conductor are formed to a single level.

3. The magnetic bubble domain generator recited in claim 2, wherein said seed bubble domain area, said adjacent areas and said conductor are permalloy.

4. The magnetic bubble domain generator recited in claim 1 wherein said seed bubble domain area is substantially circular.

5. The magnetic bubble domain generator recited in claim 1 wherein said adjacent areas of magnetizable material of said propagation path comprise elements having a V-shape.

6. The magnetic bubble domain generator recited in claim 5 wherein said conductor defines a straight line orthogonal to said propagation path, and said seed bubble domain area of magnetizable material and the apices of said V-shaped areas are disposed along said straight line, said V-shaped areas having the apices thereof directed toward said seed bubble domain area.

7. The magnetic bubble domain generator recited in claim 5 wherein said seed bubble domain area is circular, said conductor defines a straight line between said seed bubble domain area and said propagation path and said conductor intersects the apices of said one column of V-shaped areas.

8. A magnetic bubble domain generator for supplying domains to a bubble domain propagation path, said propagation path comprising a chevron track;

a permalloy conductor which intersects said chevron track at one chevron column thereof and interconnects the chevron elements of said one column;

said conductor being disposed substantially orthogonal to the direction of propagation provided by the chevron track; and a permalloy disk adjacent said chevron track and intersected by said conductor.

9. In a magnetic bubble domain generator for supplying domains to a bubble domain propagation path defined by a chevron track:

said chevron track having approximately a 24 micron period;

a straight line, permalloy conductor approximately 4 microns wide intersecting said chevron track at one chevron column thereof and interconnecting the chevron elements of said one column at the apices thereof, said conductor being disposed orthogonally to the direction of propagation provided by the chevron propagation track; and a permalloy disk approximately 24 microns in diameter adjacent said propagation track at a distance of 6–10 microns therefrom and bisected by said conductor.

* * * * *